Figure 1:
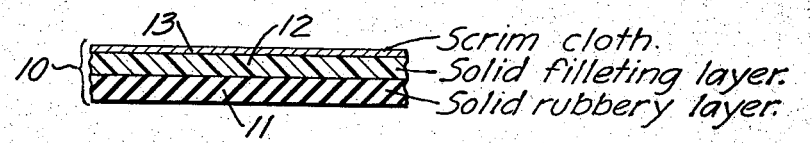

Aug. 30, 1960

A. F. MARTIN ET AL 2,951,004

BONDING FILM

Filed July 27, 1959

INVENTORS
ALBERT F. MARTIN
WARREN C. PAGEL
GEORGE M. RAMBOSEK
BY
Carpenter, Abbott, Coulter & Kinney
ATTORNEYS

United States Patent Office 2,951,004
Patented Aug. 30, 1960

2,951,004

BONDING FILM

Albert F. Martin, St. Paul, Minn., Warren C. Pagel, Whittier, Calif., and George M. Rambosek, St. Paul, Minn., assignors to Minnesota Mining and Manufacturing Company, St. Paul, Minn., a corporation of Delaware Filed July 27, 1959, Ser. No. 829,849

16 Claims. (Cl. 154—110)

This application is a continuation-in-part of our application Serial No. 670,899, filed July 10, 1957, now abandoned.

This invention relates to a composite unitary bonding film or sheet material, and in particular to a unitary sheet material having dissimilar surface layers. The sheet material of this invention is particularly adapted for use in providing a structurally strong bond between a honeycomb core structure and a skin panel, as required in certain aircraft construction, as well as in other industrial applications. While particularly adapted for use in honeycomb bonding, the sheet laminate hereof is also useful in a variety of other applications, e.g., bonding foamed materials (or other core materials) to underlying panels or substrates as in sandwich structures, bonding dissimilar materials together where varied specific adhesion to the materials is required, or even bonding surfaces or substrates of similar or identical composition together.

Recent trends in aircraft production have emphasized the importance of using honeycomb core reinforced panels in as many parts of the aircraft as possible so as to reduce the weight of the aircraft while retaining needed strength. Weight reductions in some cases become vital in order to produce an aircraft of suitable operational capabilities, whereas in others, e.g., commercial aircraft, such reductions are needed so as to increase the permissible weight load the aircraft can carry to within a range practical for commercial operation. From a theoretical standpoint, it can readily be appreciated that thin honeycomb reinforced panels should possess by far the greater strength per unit of weight than solid panels. Yet, from a practical standpoint, the full realization of such advantageous weight reduction while maintaining high strength characteristics has suffered from certain deficiencies in the adhesive bonds that have been heretofore formed between honeycomb and skin panels. Known adhesives which form highly peel-resistant bonds to skin panels have been found to serve as relatively poor anchors for honeycomb cores and vice versa.

One of the objects of this invention, therefore, is to provide the art with a composite unitary non-tacky, flexible and handleable adhesive film which has dissimilar surface layers, one of which serves to form a strong, peel resistant bond to skin panels, and the other of which serves to form a sturdy, firm, crack-resistant anchorage for honeycomb core reinforcing elements. A further object is to provide the art with a composite thin sheet article for forming such a bond between skin panels and honeycomb core structures with a minimum amount of adhesive material consistent with obtaining the required strength properties in the resulting composite honeycomb reinforced panel, and in this manner to contribute to desired reductions in weight without any significant sacrifice of strength properties. A further object is to form a composite unitary film which is non-tacky at room temperature and which has a solid rubbery heat-tackifiable and subsequently heat-curable layer, and a solid flexible epoxy or equivalent resin layer, which is heat fluidizable and yet rapidly curable at elevated temperatures to a solid thermostat infusible state of high adhesive strength under a wide range of temperature conditions. Another object is to provide a composite unitary non-sticky, flexible and handleable adhesive bonding film having dissimilar adhesive layers each available for adhesive contact or bonding to another material or surface, with at least one of the adhesive layers being capable of flowing as the film is heated in a heat-curing cycle designed to effect curing thereof. A still further object is to provide a simplified process for bonding a porous reinforcing element to a relatively flat or smooth surface such as a skin panel.

An important requirement for an aircraft bonding film for honeycomb is that of "filleting." The material of the film must exhibit capillary wetting, e.g., rise, upon the surfaces of a honeycomb core, preferably, in order to gain the highest possible strength, without the necessity of employing solvents or special primers on the honeycomb core structure. This invention provides a film having such required properties. Additionally, the film of this invention fillets at very low pressures which are sufficient to mate the honeycomb and skin panels, and thus high pressures for bonding are unnecessary. The fillet formed using the film hereof is highly dense, thus providing for improved strength and reliability of bond.

Heretofore the art has employed certain elastomer-phenolic films in the fabrication of honeycomb reinforced panels; and liquid epoxy resins have even been coated upon one surface of such films to improve anchorage of the honeycomb core. Aside from the aircraft manufacturer's practical problem of applying a coating of liquid epoxy resin in a suitably thin, yet adequately thick, uniform layer for maximum strength consistent with low adhesive weight, there is danger in using this technique that the desired character of a thin elastomer-phenolic layer and the thin liquid epoxy resin layer will be undesirably altered by the solvating action of the liquid epoxy resin. The applied liquid resin tends with time at temperatures below gelling to dissolve and remove some of the components of the elastomer-phenolic layer from that layer; and thus the layers become altered. The extent to which this solvating occurs is not easily controlled and varies almost unpredictably in view of the conditions under which the process of panel manufacture is conducted, leaving one with unpredictable results from panel to panel. In the case of relatively thick films, this solvating action may go unnoticed, and may not be harmful in and of itself, but where it is extensive between elastomer-phenolic layers and liquid epoxy coatings, disadvantageous lowering of the desired adhesive character of each layer as well as the attainable strength properties of the composite results. Additionally, liquid epoxy resin is difficult to keep in place during handling incident to making a lay-up or sandwich of a honeycomb structure and a skin panel; and the degree of bonding at various points within the structural composite is a matter of conjecture since the liquid material may flow out of place.

In view of the foregoing consideration, solvent coating of a dissolved solid epoxy resin upon an elastomer-phenolic film will readily be seen to present certain problems. While it may be useful, it is essential that the operation be conducted under controlled manufacturing conditions in order to end up with predictable results. Indeed, solvent coating on elastomer-phenolic films not only introduces solvation problems analogous to those aforediscussed, but additionally is generally disadvantageous because of the volatile matter which may remain behind in such films even after attempted drying at raised temperatures below those at which the elastomer-phenolic layer and epoxy resin layer are known to cure or "thermoset." Volatile matter in the film tends to cause pores to form therein upon subsequent heating to curing temperatures in the fabrication of the structural panels; and this has been a major deficiency of many adhesive bonding films heretofore available. Any extensive pore formation in the bonding film is a source of structural weakness in the resulting composite honeycomb reinformed panel. Also, a porous bond permits fluid penetration therein, thus introducing the possibility of bond degradation due to subsequent exposure to humidities, fuel and hydraulic fluid splashes or seepage, etc., with resultant dangers and hazards.

This invention, however, provides a composite bonding film satisfying aforenoted requirements for aircraft use, and further provides a practical solution to the problem of making such a film, even when elastomer-phenolic layers are employed as part thereof. The composite film of this invention comprises a unitary strip having a thin layer of rubber-based composition or equivalent, and a thin layer of solid filleting epoxy or equivalent resin composition. A scrim-type web material is also included in the composite film, particularly in films to be used in honeycomb core bonding. The solid rubbery layer and solid filleting epoxy layer are firmly united together to form an integral sheet product, and both layers are heat-curable under similar elevated temperature conditions. However, the time-temperature relationship for achieving cure of one layer may vary from that of the other. For example, curing of one of the layers may start at a lower elevated temperature than that temperature required by the other layer for curing. The solid epoxy layer of the bonding film of this invention is prepared without imparting disadvantageous pore forming characteristics thereto. While blending between the layers at their interface may be permissible in some applications, the specialized performance characteristics of the dissimilar adhesive material of each layer of the sheet product are maintained in the final product adapted for use as discussed herein.

The handleability of the bonding film hereof is particularly advantageous from the user's standpoint. For the first time, insofar as is known, a handleable non-sticky unitary composite film is provided with dissimilar performance characteristics, and in particular, dissimilar latent adhesive properties, on opposite sides of the film. The film is not tacky under normal room temperature conditions as that term is understood in the art of normally tacky and pressure-sensitive adhesives. Its non-sticky or essentially non-tacky character permits it to be easily shifted into position on panels or honeycomb structures in practical use applications. Heating causes it to become tacky prior to the time curing is effected, and even body heat such as from fingers, in combination with light finger pressure, may be sufficient to slightly increase the tack properties of some bonding films within the scope of the invention. This last feature may be advantageous, in combination with ease of shifting the film into position, inasmuch as such films of the invention may be weakly "tacked" in desired position simply by applying light finger pressure. It is essential, however, that the exposed surfaces of the bonding film be non-sticky so as to permit ease of handling or shifting in forming a lay-up as described hereinafter.

Figure 2:
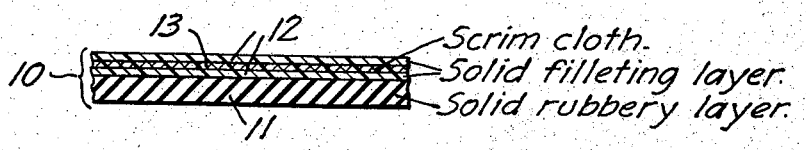
Figure 3:
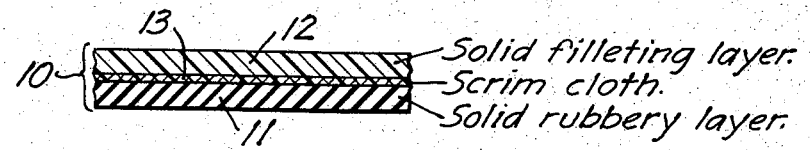
Figure 4:
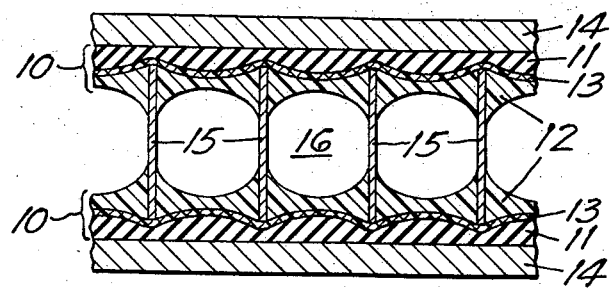

The invention will now be described in detail with reference to the illustrative drawing made a part hereof wherein: Figures 1, 2 and 3 schematically illustrate in cross-section various illustrative sheet materials hereof; and Figure 4 is a diagrammatic cross-sectional representation of a honeycomb structure bonded to a flat skin panel on each face thereof using a bonding film of this invention.

One of the critical features for the success of several practical embodiments of this invention rests in the generally new type of epoxy resin composition employed. Certain solvent-free epoxy resin compositions are heat-curable to high adhesive strengths, without volatilization and pore formation. Certain epoxy compositions also exhibit high capillarity flow and good "filleting" action. The epoxy resin compositions hereof not only possess these properties but improved additional properties. They are in a solid, non-flowable form which is flexible in thin layers or films, shippable at room temperatures or lower without deteriorating, readily fluidizable by heating and yet do not significantly cure at fluidization temperatures, and rapidly heat-cure and maintain high strength properties as a cured material under a wide range of temperature conditions.

Solid epoxy resins for use in this invention are typically produced by the reaction of 2,2-bis-(4-hydroxyphenyl) propane (i.e., Bisphenol A) and epichlorhydrin in alkaline medium; however, equivalent polyhydroxy compounds (e.g., novolac, 1,3,5-trihydroxy benzene) and compounds serving as equivalent sources for epoxy radicals may be used, as is well understood in the art. Also, suitable epoxy resins may be produced by epoxidizing double-bonds of unsaturated hydrocarbons, as is well known. These solid resinous polymeric epoxides have a 1,2-epoxy equivalency greater than 1.0, i.e., have on the average more than one 1,2-epoxy group

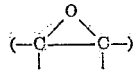

per average molecular weight. The resins are more of a complex mixture of compounds having glycidyl or epoxy groups than a single type of chemical compound; thus not all individual molecules may satisfy this requirement while others may have two or more 1,2-epoxy groups. Solid epoxy resin mixtures which have been employed with greatest success in the practice of this invention have a further characteristic: They have an initial softening point, according to Durrans' mercury method, between about 100° F., and 200° F.; and they are highly fluid at temperatures only slightly above their initial softening point. They may include portions of liquid epoxy resin material so long as the blend is solid as described. While preferred epoxy resin masses initially soften between about 100° F. and 200° F., it should be recognized that the invention is not limited solely to such resins. A typical commercially available resin of the type suitable to employ in forming our epoxy compositions is "Epon 864" of the Shell Chemical Company. "Epon 864" is a solid brittle epoxy resin (reaction product of Bisphenol A and epichlorhydrin) which softens (Durrans' method) and begins to flow at about 115° F. Its epoxide equivalent weight is 300 to 375. Epoxide equivalent weight as here employed means that approximately 300 to 375 grams of the resin mixture contain only one gram equivalent weight of epoxide (oxirane oxygen). "EKRB 2002 Epoxide Plastic" of the Union Carbide Plastic Company of the Union Carbide Corporation is another solid epoxy resin formed by the condensation of Bisphenol A and epichlorhydrin. This resin softens it about 145 to 170° F. (Durrans' method); and about 450 to 525 grams of the resin contain one gram equivalent of epoxide. "Epon 834" of the Shell Chemical Company is an epoxy resin which begins to melt at about 82° F. (Durrans' method) and has an epoxy equivalent range of 225–290. While this resin is to be considered more of a liquid type than a solid type, as the term is here employed, it is highly viscous at room temperature and may be employed in combination with solid epoxy resins of higher softening points, e.g., "EKRB 2002," in the practice of this invention. "ERL 2774 Epoxide Plastic" of the Union Carbide Plastic Company is a liquid epoxy resin (viscosity of about 11,000–14,000 cps. at 80° F.) formed by reacting Bisphenol A with epichlorhydrin, and may be blended with high melting solid epoxy resins to produce a solid resin mass having initial softening in the preferred range aforediscussed.

In preparing epoxy resin compositions for this invention, the following procedure has been employed: The solid epoxy resin ingredient has first been melted by heating and then it has been raised to about 250° F. To the molten liquid resin at about 250° F. is added a finely-divided, chemically inert, inorganic filler and the mixture raised to about 300° F. and stirred for about 10 to 20 minutes, after which it is lowered to about 220° F. and held in readiness for the addition of curing agent or hardener. (Heating and stirring at about 300° F. de-aerates the mass, removing air which may be entrapped in particles of the filler, and additionally facilitates thorough wetting of the filler particles with epoxy resin.)

Next a curing agent which is rapidly activatable (within 2 hours) to cure the solid epoxy resin at a temperature above 200° F. (and which preferably is relatively inactive to effect rapid cure at temperature below 200° F.) is mixed with a small amount of a suspending filler, for example, an organophilic bentonite, as well as any auxiliary agents or possible accelerators for curing; and the resulting mix (pre-mix B) added to the molten epoxy resin (pre-mix A) held at about 220° F. This composite mixture is then passed through a heated (170° F.) paint mill until thorough dispersion of the ingredients is accomplished, up to about three passes being sometimes necessary. The temperature of this mix is held at least below about 200° F. from this point onward in making the composite layer structures hereof. The milled product, when cooled to room temperature (about 70° F.), is a solid. In chunks it appears brittle and untractable, but in film form on a rubbery or rubber-based layer as taught herein it is sufficiently flexible to permit bending and rolling upon a core, as well as other ordinary handling, without spalling from the rubbery layer.

Before proceeding with a description of a method of preparing the unitary sheet products hereof, a group of illustrative epoxy resin compositions prepared as aforedescribed will be set forth:

EPOXY COMPOSITION NO. 1

Pre-mix A: Parts by weight
"Epon 864" _____ 100
Finely divided silicon dioxide ("Cab-O-Sil") ___ 5

Pre-mix B:
Isophthalyl dihydrazide (curing agent)_____ 14.5
Magnesium oxide ("Maglite M") (auxiliary catalyst to effect cure)_____ 10
Dimethyl dioctadecyl ammonium bentonite ("Bentone 34") (suspending filler—for further details see U.S. Patent No. 2,531,427 to Hauser, here incorporated by reference)____ 1

EPOXY COMPOSITION NO. 2

Pre-mix A: Parts by weight
"Epon 834" _____ 50
"EKRB 2002" _____ 50
Finely divided silicon dioxide _____ 5

Pre-mix B:
Methylamino dihydrazino triazine (curing agent) _____ 12.2
Dimethyl dioctadecyl ammonium bentonite __ 1

EPOXY COMPOSITION NO. 3

Pre-mix A:
"Epon 864" _____ 100
Finely divided silicon dioxide _____ 5

Pre-mix B:
Methylamino dihydrazino triazine (curing agent) _____ 12.2
Dimethyl dioctadecyl ammonium bentonite __ 1

EPOXY COMPOSITION NO. 4

Pre-mix A:
"Epon 834" _____ 50
"EKRB 2002" _____ 50
Finely divided silicon dioxide _____ 5

Pre-mix B:
Dicyandiamide (curing agent) _____ 6
Dimethyl dioctadecyl ammonium bentonite __ 1

EPOXY COMPOSITION NO. 5

Pre-mix A:
"Epon 834" _____ 50
"EKRB 2002" _____ 50
Finely divided silicon dioxide _____ 5

Pre-mix B:
N,N' diallyl melamine (curing agent) _____ 16.2
Dimethyl dioctadecyl ammonium bentonite __ 1

While all of these epoxy resin compositions heat cure to a non-melting thermoset rigid state of high shear strength over a wide range of temperature (e.g., from as low as —67° F. or lower to about 300° F., or even higher), compositions Nos. 1, 2 and 3 are preferred in that they exhibit higher shear strengths in cured state over a wider range of temperatures than compositions 4 and 5.

It will be understood that this invention envisages that ingredients other than those illustrated in the several formulas above may be incorporated in the curable filleting layer to gain desired specialized or additional properties without departing from the essential characteristics required in the layer. Coloring agents may be added. Small amounts of rubber may be substituted for bentonite and/or silica filler in the above formulas to control or limit excessive flow of the filleting layer at melting temperatures. However, usually no more higher rubber-like material than about 2 to 3% of the weight of the epoxy resin can be tolerated in this filleting layer; and the small amount employed must not interfere with the required filleting character of the layer. Also, flexibilizing agents such as polyvinyl formal ("Formvar") may be added to the composition of the filleting layer, if desired; and amounts on the order of about 15% by weight based on the weight of the epoxy content tend to reduce the brittleness of the cured layer, without upsetting required characteristics. In addition, or as a separate matter, quantities of resin materials other than those of the epoxy-type may be employed in the layer so long as the required performance characteristics of the layer are not upset.

Before proceeding further with a description of a method for making the sheet article hereof, the character of the heat-curable rubber-based layer will be discussed. As compared to the cured filleted epoxy layer, the cured rubber-based layer is more flexible, is more stretchable, has a generally higher toughness, need not fillet, and in the composite films hereof, serves particularly to absorb and dissipate peeling forces within itself, thereby preventing such forces from being directly transmitted to the epoxy layer or locally loading up in that layer. Yieldability is a critical feature of the cured rubber-based layer, and the yieldability of this layer must be greater than that of epoxy layer. It has been conjectured that part of the reason why the bonding film of this invention gives results so superior to single composition bonding films in honeycomb bonding applications lies in the manner in which the rubber-based layer of our film absorbs peeling forces and related shock forces so as to protect the relatively more rigid cured epoxy material from damage by such forces, and permit the epoxy material to function effectively as an anchoring structure fixing the ends or edges of honeycomb in relatively rigid position analogously to a fixed end-column. This theory is offered to facilitate understanding of the invention, but in no sense is it offered as a complete or necessarily accurate explanation of the extraordinarily improved results achieved in honeycomb bonding by following the teachings hereof.

The essential requirements of the rubbery layer of this invention, however, make it necessary that an elastomeric or rubber-like material be employed as the base ingredient of the formulation. While vital as an ingredient in the formulation, it should be realized that some elastomeric materials may be used in proportions much lower than others, and the amount of elastomer needed in the layer varies with the effectiveness of the elastomer in performing as a rubber-like material in the layer. Thus, some elastomeric polymers such as carboxylic acid modified polymers of butadiene and acrylonitrile, which are highly stretchable and rapidly retractable in the cured or semi-cured state, may be employed in small amounts in the layer (e.g., amounts as low as 10% of the weight of the layer in some formulations) while still retaining the essential rubbery characteristic of the layer as aforediscussed. An illustrative formula containing such a small amount of of rubber material, and yet a sufficient amount to impart the required flexibility, yieldability, and absorptivity of peel forces, as required, is one consisting of about 15 parts of a carboxylic acid modified polymer of butadiene and acrylonitrile ("Hycar 1072"), 0.74 part zinc oxide, 0.41 part sulfur, 0.25 part of a cyclohexamine salt of mercaptobenzo thiazol ("Santocure"), 20 parts of a liquid epoxy resin ("ERL 2774"), 80 parts of a solid epoxy resin ("EKRB 2002"), and about 11 parts of dicyandiamide. A rubber-based layer of this composition may be used in combination with epoxy resin filleting layers such as illustrated in the compositional formulas above to provide a composite bonding film satisfying the essential requirements of this invention. The resulting film, in the cured state, absorbs forces of peel, tension, shear, etc., in its cured rubber-based layer, which is relatively yieldable and flexible as compared to the epoxy filleted layer, and thereby the rigid epoxy layer is largely shielded from such forces and serves its rigid anchoring function as required.

The immediately foregoing discussion is offered to emphasize that "rubber-based" as used in the claims of this case, does not mean that a major amount of the layer must be rubber, whether natural or any of a variety of synthetics adapted to perform the essential functions of rubber in this layer. Rather, the essential character of the layer dictates that rubber, whether natural or synthetic, is a vital component in its formulation. Synthetic elastomeric polymers which exhibit stretchability and retractability, and are therefore rubber-like, find uses as replacements for rubber, in many adhesive compositions, frequently with the gain of additional advantageous properties largely attributable to the character of the synthetic elastomer itself. While the foregoing illustration of a rubber-based layer containing as little as about 10% rubber is still within the essential concept of this invention, greater amounts of elastomers (e.g., 25% or more by weight of layer) are employed in the rubber-based layers of most of the practical commercial embodiments of the invention. Larger quantities of rubber-like material in the rubber-based layer not only render the attainment of the required properties in the layer less difficult, from the standpoint of dependency upon a minimum content of rubber functioning with maximum effectiveness, but also permit one to attain greater flexibility and yieldability in this layer, as well as greater absorptivity of peel and related forces in the layer, as desired.

A variety of synthetic elastomers of rubber-like properties may be employed in compounding a rubber-based layer, and the following listing is only intended to be illustrative: Butyl rubbers, acrylate rubbers (e.g., cyanothiopentyl acrylate, perfluorobutyl acrylate—advantageous for their resistance to "Skydrol 500," a hydraulic fluid used frequently in commercial aircraft), polyamide or nylon elastomers (e.g., N-substituted polyamides, methylol modified polyamides—also advantageously resistant to "Skydrol 500"), etc. New synthetic elastomer materials constantly are being developed for use as replacements or substitutes for rubber, frequently with improved results largely attributable to the elastomer; and the use of such materials in formulating a suitable rubber-based layer according to this invention is contemplated and to be expected. While skill may be required, it will be a simple matter for an adhesive rubber-chemist, utilizing the teachings of this invention, and practical laminates of this invention as a guide, to conduct routine experiments with different formulas and arrive at a satisfactory formula for the rubber-based layer utilizing synthetic rubbers or elastomers as they become available. Curing agents other than those mentioned herein may be necessary, but such teachings as well as the use of fillers and other modifiers are well within the skill of an adhesive rubber-chemist. In essence, the specific formula employed for the rubber-based layer hereof forms no part of this invention, so long as the essential properties for the layer, as set forth in the claims are maintained.

An interesting example of a suitable rubber-based layer for use in combination with a filleting epoxy layer to form the bonding films hereof is one based on nylon as the rubber-like ingredient. Such a rubber-based layer may be formed by solvating 70 parts of a polyamide ("Zytel 61," a nylon modified with methylol off some of the amide nitrogens) in 60 parts of methanol and 20 parts water, using agitation and heat at about 150° F. for 2 hours. Separately 20 parts of a solid epoxy resin ("EKRB 2002") are blended with 10 parts of a liquid epoxy resin ("ERL 2774") and 4.2 parts of a curing accelerator (2,4-dihydrazino 6-methylamino-s-triazine) on a paint mill, and then the mass solvated in about 20 parts methyl ethyl ketone. The temperature of the nylon solution is reduced to about 100° F. and the epoxy mass blended therein. The mass is then coated on a low-adhesion substrate (polyethylene coated paper) and mildly heated up to about 180° F. until solvent is removed.

We will now proceed to the description of a particular embodiment for the rubber-based layer which has been found to give especially satisfactory results in many practical laminates according to the invention. The particular embodiment is formed from a blended mixture of ingredients including a diene-type rubbery elastomer, at least one heat-activatable curing agent for the elastomer, and between about 25 and 500 parts by weight of heat-reacting, thermosetting, alcohol-soluble, phenol-aldehyde resin for every 100 parts of elastomer. Preferably about 50 to 300 parts of such resin for every 100 parts of elastomer are employed. Various fillers, curing accelerators, etc., may be incorporated to gain improvements in the resulting layer as imparted by such ingredients, as is well understood by those skilled in the art of forming various elastomerphenolic layers of the type here discussed. The elastomeric ingredient is referred to as "diene-type" since it characteristically is formed from monomers, or a mixture of monomers, which includes at least a major proportion, i.e., over 50% of a conjugated diolefin such as butadiene. The preferred elastomeric constituent is a copolymer of butadiene and acrylonitrile known as Buna N rubber. Other diene-type rubbery elastomers may be useful in combination with special phenol-aldehyde resins to provide elastomer-phenolic films useful in the practice of this invention. Some illustrative diene-type elastomers are polychloroprene, copolymers of butadiene and styrene, etc.

In one procedure for making the elastomer-phenolic layer, the rubbery elastomer is first milled to plasticity on a rubber mill and then the other ingredients of the blend are added and milled into the plastic mass until a uniform blend is obtained. The resulting blended mixture may then be formed into a uniform layer by calendering, extruding, casting, etc., as well known in the art. In the event casting is employed—and this is the preferred technique for making the thinner elastomer-phenolic films, e.g., 3 mil thicknesses, for use in this invention—the volatile organic solvent employed can be substantially completely volatilized from the film or layer by mild heating so as thereby to obviate pore formation problems in the composite sheet material hereof.

The following are some illustrative blends satisfactory to employ in forming the elastomer-phenolic layer hereof:

Blend No. 1

| | Parts by weight |
|---|---|
| Buna N elastomer (B. F. Goodrich's "Hycar 1001," a copolymer of butadiene and acrylonitrile having a combined acrylonitrile content of about 38% by weight) | 100 |
| Heat-reactive phenol-aldehyde resin (a mixture of (a) 50 parts of "Durez 7031A," of Hooker Electrochemical Company, an alkaline catalyzed (about 8.7 to 9.5% hexamethylene tetramine), alcohol-soluble, flow-resistant, fast-setting phenol-aldehyde resin having a minimum initial melting point of about 190–198° F. and (b) 50 parts of "Durez 12687," a basically catalyzed (about 8.8 to 9.3% hexamethylene tetramine), alcohol-soluble phenol-aldehyde resin initially softening in the range of about 160–170° F.) Both of these resins are cured to an alcoholic-insoluble state by brief heating at raised temperatures, e.g. 300° F. | 60 |
| Sulfur (curing agent) | 1 |
| Benzothiazyl disulfide ("Altax") (curing agent) | 1 |
| Zinc oxide (curing accelerator) | 5 |

Blend No. 2

The same ingredients as in Blend No. 1 were used except that the heat-reactive phenol-aldehyde resin content consisted here solely of "Durez 7031A." It was employed in the amount of 100 parts for 100 parts of the elastomer.

Blend No. 3

The same ingredients as in Blend No. 1 were used except that the heat-reactive phenol-aldehyde resin here consisted solely of "Durez 12687" in the amount of 100 parts for every 100 parts of elastomer.

The following are illustrative examples of composite unitary sheet materials of this invention.

EXAMPLE 1

Blend No. 1 is calendered at a temperature of about 130–160° F. into a film having an essentially uniform thickness of about 6 mils, and then reduced to room temperature. The average weight of this film is about 16–18 grams per square foot of area. Under the noted conditions for calendering, this blend remains essentially uncured. It is rapidly cured at temperatures around 200–230° F. or higher (e.g., 350° F.).

Epoxy resin composition No. 1, while held at 160° F., at which temperature it is fluid, is then hot-melt coated as an essentially uniform layer of about 8 mils thickness over one surface of the calendered film. At this thickness the average weight of this epoxy layer is about 23–25 grams per square foot of area. At 160° F., this epoxy composition has a pot life of about 10–16 hours, which leaves ample time for conducting the hot-melt coating operation (which normally will not require holding the composition at 160° F. for any longer than 5 or 6 hours), without substantially deteriorating the heat-fluidizable and heat-cure properties of the epoxy composition of the layer.

Over the applied molten epoxy coating was then placed a light-weight (about 3–4 grams per square foot) cotton scrim cloth (i.e., a porous, loosely-woven, unbleached, unsized cotton cloth having a thread count per square inch of about 12 by 24).

The essentially uniform sheet product was then cooled to room temperature where its surfaces are essentially non-sticky. The time during which the hot, molten epoxy resin composition remains hot and molten after coating upon the elastomer-phenolic layer is relatively short, and does not permit of any substantial solvating action by the molten epoxy upon the elastomer-phenolic layer. The finished sheet product is placed with its elastomer-phenolic layer resting upon a low-adhesion interliner such as polyethylene film, and then wound into roll form with the interliner separating the convolutions in the roll. Such an interliner positioned next to the outer surface of the elastomer-phenolic layer serves advantageously to protect this surface from being smudged or contacted with grease, as from fingers during handling of the composite sheet article hereof. Grease or other contamination on the elastomer-phenolic layer causes defects in its bond to a skin panel. Additionally, temperatures around 40° F. or lower are used to store the product so as to reduce to a minimum any tendency for aging within the elastomer-phenolic layer.

The composite sheet material of this example is particularly useful in application where high strength bonding is needed for honeycomb reinforced panels subjected to a range of temperature varying from −67° F. or lower up to about 300° F. The average weight of the sheet product of this example is about 45 grams per square foot.

Referring now to Figures 1 and 4, the performance of this sheet product as a unitary bonding film for aircraft honeycomb reinforced panel construction will be discussed. The sheet product 10, as illustrated in Figure 1, is placed with its rubber-based layer 11, after stripping the polyethylene interliner therefrom, next to previously cleaned and etched aluminum skin panels or face sheets, and with its epoxy composition layer and scrim cloth layer in position for receiving a honeycomb core structure thereover. If desired, the skin panels or face sheets may be primed with a coating of solvent-dispersed adhesive priming material or the like, although such is unnecessary using the preferred illustrative embodiments of the bonding film hereof.

The bond between the honeycomb structure and the epoxy composition layer, and between the rubber-based layer and the skin panel may be formed as follows: Pressure (e.g., about 25 lbs./in.$^2$) is applied upon the exterior of each skin panel (numeral 14 as illustrated in Figure 4) so as to mate the metal parts and force the lay-up together. Simultaneously the lay-up is heated (e.g., about 4° F. temperature rise per minute from room temperature to about 350° F., which is held for about 2 hours for strongest bonds). In the heating cycle the epoxy composition layer first fluidizes, passes through the pores of the scrim cloth, and "fillets," as illustrated at 12 in Figure 4. This "filleting" action takes place within about one minute after the epoxy layer is fluidized. Thereafter, on continued increase of temperature, this layer cures to a solid rather brittle thermoset state of high shear strength (but relatively lower peel-resistance as compared to the rubber-based layer) holding the honeycomb structure in place. Simultaneously the rubber-based layer is cured during heating, and at the temperature needed for curing the epoxy composition layer, the rubber-based layer becomes essentially completely cured. Thus, the rubber-based layer anchors itself firmly in a peel-resistant manner to the skin panel. In terms of the resulting composite honeycomb reinforced structural panel, it may be observed that the cured "filleted" epoxy composition primarily provides beam flexural strength (beam shear and bending strength) and end edgewise compression strength, whereas the rubber-based layer provides secure tough peel-resistant anchorage for the skin panels, as well as a "buffing" effect in that it absorbs shock and peel forces acting on the structural panel during practical use, and prevents such forces from damaging the fixed and relatively rigid anchorage of the ends or edges of the honeycomb. The strength of the adhesive bond thus formed is so great that it has remained essentially undamaged in beam flexure tests which have caused failure to the internal aluminum honeycomb core of a composite structural panel composed of aluminum materials and the bonding film of this example.

Figure 4 illustrates the resuling structural composite formed according to the foregoing procedure using the bonding film of this example. As there diagrammatically illustrated, scrim cloth 13 has migrated from the outer surface of the sheet product of this example (see Figure 1) and rests adjacent to cured rubber-based layer 11. Migration of this scrim cloth, of course, takes place during the heating cycle aforediscussed, while the epoxy composition layer was in fluid condition. As illustrated in Figure 4, pressure applied to the exterior surfaces of skin panels 14 during forming, usually forces honeycomb walls 15, and scrim cloth 13, at points contacted by walls 15, into the body of rubber-based layer 11 a short distance. Number 16 in Figure 4 designates a hollow cell defined by cell walls 15 of the honeycomb structure.

EXAMPLE 2

Blend No. 2 above is calendered at a temperature of about 130–160° F. into a layer 10 mils thick, and then reduced to room temperature. This layer weighs about 30 grams per square foot of area. Resin composition No. 2, while at a temperature of about 160° F. where it is fluid, is hot-melt coated at a thickness of 12 mils (about 36 grams per square foot area) upon one side of the elastomer-phenolic layer, and the cotton scrim cloth of Example 1 placed thereover. The product is then cooled to room temperature, where its surfaces are non-tacky and it may be easily handled as a flexible film. Here also the elastomer-phenolic layer is rested upon a low adhesion surface such as that afforded by polyethylene coated paper. The sheet product is wound into roll form using this paper as an interliner to protect the outer surface of the elastomer-phenolic layer. On the average, the weight of this unitary sheet product is about 65–70 grams per square foot.

In the process of bonding a honeycomb structure to an aluminum panel, the sheet article of this example functions in an analogous manner to that described in Example 1.

From a process standpoint, it will be appreciated that the expedient employed to gain heat for curing and to press the lay-up of skin panels and honeycomb together may vary. Thus, vacuum forming techniques may be employed where, for example, air within honeycomb cells is exhausted and normal atmospheric pressure relied upon to force the lay-up together under pressure. Induction or resistance heating may be employed. In practice, such variations in process may dictate modifications of the composition of the rubber-based or epoxy layers from that specifically illustrated in Example 1 for use in the process of forming the structural laminate as set forth under Example 1 hereof. For example, vacuum forming may dictate that a rubber-based layer free of phenol-formaldehyde be employed, e.g., a rubber-based layer such as the one illustrated above containing an acid modified polymer of butadiene and acrylonitrile. Still other modifications of process may dictate further modification of the specific formula selected for layers of the laminate.

It will readily be appreciated that composite unitary bonding films of this invention may comprise various combinations of layers formed using epoxy resin compositions and rubber-based blends such as aforesetforth. The rubber-based layer and filleting layer of the film may be combined through an intermediate layer or priming adhesive coating, if desired, but such is to be avoided where maximum reductions in weight are required, as in aircraft structural panels. Exposed surfaces of the rubber-based layer or filleting layer may be dusted with a transient inert powder, if desired, to improve sliding of the film incident to forming a lay-up, or they may be coated with other transient material which becomes part of the composition of the layer at the time of heating to form a bond; however, little is to be gained by such expedients, and transient coatings may interfere with maximum adhesive contact, particularly between a rubber-based layer and a skin panel.

Scrim-type cloths or webs of a wide variety are useful in making the sheet article hereof. They improve the strength of the sheet article, serving as a carrier to protect the epoxy composition layer against fracture; and thereby provide for improved ease of handling. As part of the material of the bond between a metal honeycomb core and a metal skin panel, scrim cloths function to resist propagation of a failure along a bonded joint, and serve also to prevent metal-to-metal fatigue by separating the cell wall edges of the metal honeycomb from the metal skin walls. In conducting the bonding of a honeycomb structure to a skin panel, the scrim cloth aids in keeping the elastomer-phenolic layer in contact with the skin panel over all areas, particularly in areas within the open cell portion of the honeycomb; and thereby the scrim cloth contributes to the attainable strength in the finished reinforced structural panel. These scrim cloths are porous so as to permit flow of heat-fluidized epoxy therethrough. Alternate structures may be woven or non-woven webs of materials such as, for example, cotton, glass fibers, metal wire, synthetic fibers, etc. Preferred scrim-type webs to employ are light weight, e.g., up to about 6 grams per square foot of area.

As illustrated in Figures 1, 2 and 3, the scrim-type web of the sheet article hereof may be on the outer surface of the epoxy composition layer, within this layer, or as a network between this layer and the rubber-based layer. Preferably, however, the scrim-type web is positioned on the outer surface of the epoxy composition or filleting layer, as illustrated in Figure 1, or within the layer as illustrated in Figure 2. As an alternative structure, the scrim-type web may be positioned within the rubber-based layer of our product.

For most applications in the aircraft industry, the bonding films hereof should not exceed a weight of about 130 grams per square foot, a weight of about 15 to 90 grams per square foot possibly being of widest application. In general rubber-based layers may vary from about 3 to about 20 mils in thickness, and from about 6 to 60 grams per square foot in weight. Epoxy resin composition layers usually range from about 4 to 20 mils in thickness, and about 12 to 60 grams per square foot in weight.

The bonding film of this invention is particularly adapted for bonding aluminum honeycomb structures to aluminum skin panels, but also may be employed in the bonding of honeycombs made from other materials than aluminum to skin panels other than those of aluminum metal, as well as in a variety of other applications as aforediscussed.

Those skilled in the art will readily appreciate that modifications may be made in the invention disclosed herein without departing from the spirit thereof; and in this respect, the foregoing is to be construed as illustrative and not limitative of the scope of this invention.

That which is claimed is:

1. A composite handleable shippable unitary flexible adhesive sheet material having dissimilar non-sticky outer surface layers adapted for forming a permanent heat-cured bond of high peel strength and high beam shear strength over a wide range of temperature between aluminum skin panels and aluminum honeycomb structures, said sheet material being non-bonding to low adhesion surfaces of an interliner separating overlapping convolutions of the sheet material in roll form, and comprising (1) a room-temperature-non-sticky, solid, heat-curable, rubber-base adhesive layer characterized by being curable at elevated temperatures to a non-brittle thermoset condition, and (2) a room-temperature-solid and -non-sticky, heat-fluidizable, heat-curable epoxy resin adhesive layer characterized by being (a) flowable as a viscous liquid of high filleting action as it is elevated in temperature, and (b) curable from said flowable state to a solid thermoset state at higher elevated temperatures which serve also to cure said rubber-base layer, said epoxy resin adhesive layer comprising a room-temperature-solid epoxy resin initially softening at a temperature between about 100 and 200° F., and a heat-activatible curing agent for said solid epoxy resin.

2. A composite handleable shippable unitary flexible adhesive sheet material having dissimilar non-sticky outer surface layers adapted for forming a permanent heat-cured bond of high peel strength and high beam shear strength over a wide range of temperature between aluminum skin panels and aluminum honeycomb structures, said sheet material being non-bonding to low adhesion surfaces of an interliner separating overlapping convolutions of the sheet material in roll form, and comprising (1) a room-temperature-non-sticky, solid thermoplastic, heat-curable, elastomer-phenolic adhesive layer characterized by being curable from a thermoplastic to a non-brittle thermoset condition at elevated temperatures, said elastomer-phenolic adhesive layer comprising a diene-type rubbery elastomer, between 25 and 500 parts by weight of an alcohol-soluble, heat-reactive, phenol-aldehyde resin for every 100 parts of said elastomer, and a heat-activatible curing agent for said elastomer, and (2) a room-temperature-solid and -non-sticky, heat-fluidizable, heat-curable epoxy resin adhesive layer characterized by being (a) flowable as a viscous liquid of high filleting action at a raised temperature above 100° F., and (b) curable from said flowable state to a solid thermoset state within about 2 hours at a temperature at least above 200° F., said layer comprising a room-temperature-solid epoxy resin initially softening between about 100 and 200° F. and having a 1,2-epoxy equivalency of at least one, a heat-activatible curing agent for said solid epoxy resin, and finely divided filler material.

3. A composite handleable shippable unitary flexible adhesive sheet material having dissimilar non-sticky outer surface layers adapted for forming a permanent heat-cured bond of high peel strength and high beam shear strength over a wide range of temperature between aluminum skin panels and aluminum honeycomb structures, said sheet material being non-bonding to low adhesion surfaces of an interliner separating overlapping convolutions of the sheet material in roll form, and comprising (1) a room-temperature-non-sticky, solid, heat-curable, rubber-base adhesive layer characterized by being curable at elevated temperatures to a non-brittle thermoset condition, (2) a room-temperature-solid and -non-sticky, heat-fluidizable, heat-curable epoxy resin adhesive layer characterized by being (a) flowable as a viscous liquid of high filleting action as it is elevated in temperature, and (b) curable from said flowable state to a solid thermoset state at higher elevated temperatures which serve also to cure said rubber-base layer, said epoxy resin adhesive layer comprising a room-temperature-solid epoxy resin, a heat-activatible curing agent for said solid epoxy resin, and finely divided filler material, and (3) a thin, reinforcing scrim-type web.

4. A composite handleable shippable unitary flexible adhesive sheet material having dissimilar non-sticky outer surface layers adapted for forming a permanent heat-cured bond of high peel strength and high beam shear strength over a wide range of temperature between aluminum skin panels and aluminum honeycomb structures, said sheet material being non-bonding to low adhesion surfaces of an interliner separating overlapping convolutions of the sheet material in roll form, and comprising (1) a room-temperature-non-sticky, solid, thermoplastic, heat-curable elastomer-phenolic adhesive layer characterized by being curable at elevated temperatures from a thermoplastic to a non-brittle thermoset condition, said elastomer-phenolic adhesive layer comprising butadiene-acrylonitrile elastomer and phenolaldehyde resin, (2) a room-temperature-solid and -non-sticky, heat-fluidizable, heat-curable epoxy resin adhesive layer characterized by being (a) flowable as a viscous liquid at a raised temperature above 100° F., and (b) curable from said flowable state to a solid thermoset state within about 2 hours at a temperature at least above 200° F., said layer comprising a room-temperature-solid epoxy resin initially softening at a temperature between about 100 and 200° F. and having a 1,2-epoxy equivalency of at least one, a heat-activatible curing agent for said solid epoxy resin, and finely divided filler material, and (3) a thin reinforcing scrim-type web.

5. The unitary adhesive sheet material of claim 4 wherein the scrim-type web is cotton scrim cloth.

6. A composite handleable shippable unitary flexible adhesive sheet material having an average weight not exceeding 90 grams per square foot of area and having dissimilar non-sticky outer surface layers adapted for forming a permanent heat-cured bond of high peel strength and high beam shear strength over a wide range of temperature between aluminum skin panels and aluminum honeycomb structures, said sheet material being non-bonding to low adhesion surfaces of an interliner separating overlapping convolutions of the sheet material in roll form, and comprising (1) an essentially uniform, room-temperature-non-sticky, solid, thermoplastic, heat-curable, elastomer-phenolic adhesive layer not exceeding about 20 mils in thickness and characterized by being curable at elevated temperatures from a thermoplastic to a non-brittle thermoset condition, said elastomer-phenolic adhesive layer comprising butadiene-acrylonitrile elastomer and phenol-aldehyde resin, (2) an essentially uniform, room-temperature-solid and -non-sticky, heat-fluidizable, heat-curable epoxy resin adhesive layer not exceeding about 20 mils in thickness and characterized by being (a) flowable as a viscous liquid at a raised temperature between about 100 and 200° F. and by remaining flowable at least about 8 hours when held slightly above its initial softening point at a temperature within said range, and (b) curable from said flowable state to a solid thermoset state within about 2 hours at a temperature at least above 200° F., said layer comprising a room-temperature-solid epoxy resin initially softening at a temperature between 100 and 200° F., and having a 1,2-epoxy equivalency of at least one, a curing agent activatible at a temperature between about 200 and 400° F. to cure said solid epoxy resin, and finely divided filler material, and (3) a thin reinforcing scrim-type web.

7. The sheet material of claim 6 wherein the scrim-type web is positioned over one surface of the epoxy resin adhesive layer and the other surface of said epoxy resin adhesive layer is in contact with said elastomer-phenolic layer.

8. The method of forming a permanent heat-cured bond of high peel strength and high beam shear strength over a wide range of temperature between skin panels and honeycomb core structures comprising (1) forming a lay-up including a skin panel, a composite unitary adhesive sheet material thereover, and a honeycomb core over said adhesive sheet material, said adhesive sheet material including (a) a room-temperature-non-sticky, solid, heat-curable, rubber-base adhesive layer, (b) a room-temperature-solid and -non-sticky, heat-fluidizable, heat-curable epoxy resin adhesive layer characterized by being (i) flowable as a viscous liquid of high filleting action as it is elevated in temperature, and (ii) curable from said flowable state to a solid thermoset state at higher elevated temperatures which serve also to cure said rubber-base layer, and (c) a thin, reinforcing scrim-type web, the rubber-base layer of said sheet material being juxtaposed in adjacent relation to said skin panel, and (2) gradually heating said lay-up while forcing it together under pressure, thereby to cause the epoxy resin adhesive layer of said adhesive sheet first to melt and fillet upon said honeycomb core, and thereafter cause substantially complete curing and bonding of said filleted epoxy resin adhesive and said rubber-base adhesive layer to said honeycomb core and skin panel, respectively.

9. A composite handleable shippable unitary flexible adhesive sheet material having dissimilar non-sticky outer surface layers adapted for forming a permanent heat-cured bond of high peel strength and high beam shear strength over a wide range of temperature between skin panels and honeycomb structures, said sheet material comprising (1) a room-temperature-non-sticky, solid, heat-curable, rubber-base adhesive layer characterized by being curable at elevated temperatures to a non-brittle thermoset condition, and (2) a room-temperature-solid and -non-sticky, heat-fluidizable, heat-curable epoxy resin adhesive layer bonded to said rubber-base adhesive layer, said epoxy resin adhesive layer characterized by being (a) flowable as a viscous liquid of high filleting action as it is elevated in temperature, and (b) curable from said flowable state to a solid thermoset state at higher elevated temperatures which serve also to cure said rubber-base layer, said epoxy resin adhesive layer comprising a room-temperature-solid epoxy resin having oxirane oxygen groups, and a heat-activatible curing agent for said solid epoxy resin.

10. A handleable laminated adhesive sheet material the outer surface layers of which are dissimilar, said sheet material being adapted for forming permanent heat-cured bonds of high peel strength and high beam shear strength over a wide range of temperature between skin panels and honeycomb structures, and comprising (1) an outer surface layer of a room-temperature-non-sticky, solid, heat-curable rubber-base adhesive layer characterized by being curable at elevated temperatures to a non-brittle thermoset condition and by developing firm adhesive anchorage to a skin panel as it is cured in contact therewith, (2) a room-temperature-solid and -non-sticky, heat-fluidizable, heat-curable epoxy resin adhesive layer characterized by being (a) flowable as a viscous liquid at a raised temperature above 100° F., and (b) curable from said flowable state to a solid state within about 2 hours at a temperature above 200° F., said epoxy resin adhesive layer comprising a room-temperature-solid epoxy resin initially softening at a temperature between about 100 and 200° F. and having oxirane oxygen groups, and a heat-activatible curing agent for said solid epoxy resin, and (3) a reinforcing scrim-type web.

11. The method of forming a permanent heat-cured bond of high peel strength and high beam shear strength over a wide range of temperature between skin panels and honeycomb core structures comprising (1) forming a lay-up including a skin panel, a laminated adhesive sheet material thereover, and a honeycomb core over said adhesive sheet material, said adhesive sheet material including (a) a room-temperature-non-sticky, solid, heat-curable, rubber-base adhesive layer, (b) a room-temperature-solid and -non-sticky, heat-fluidizable, heat-curable epoxy resin adhesive layer characterized by being (i) flowable as a viscous liquid at a raised temperature between 100° F. and 200° F., and (ii) curable from said flowable state to a solid thermoset state within about 2 hours at a temperature above 200° F., and (c) a thin, reinforcing scrim-type web, the rubber-base adhesive layer of said sheet material being juxtaposed in adjacent relation to said skin panel, (2) raising the temperature of said lay-up to at least 100° F. and below 200° F. while forcing it together under pressure, whereby the epoxy resin adhesive layer melts and fillets upon said honeycomb core, and then (3) further raising and maintaining the temperature of said lay-up at least above 200° F., for up to about 2 hours to effect substantially complete curing and bonding of said filleted epoxy resin adhesive layer as well as said rubber-base adhesive layer to said honeycomb core and skin panel, respectively.

12. A composite handleable shippable unitary flexible adhesive sheet material having room-temperature-solid, non-sticky, dissimilar, outer adhesive layers on opposite sides thereof, one of said outer adhesive layers being a heat-tackifiable rubbery layer containing a rubber-like elastomer, said rubbery layer being curable at elevated temperatures to a non-brittle thermoset condition, and the other of said outer adhesive layers being a heat-filleting epoxy resin layer which is fluidized as it is elevated in temperature and then cured to a relatively rigid thermoset infusible state at higher elevated temperatures which serve also to cure said rubbery layer, said epoxy resin layer comprising a room-temperature-solid epoxy resin and a heat-activatible curing agent therefor.

13. The article of claim 12 wherein the rubber-like elastomer of the rubbery layer is an elastomeric polyamide.

14. A composite handleable shippable unitary flexible adhesive sheet material having room-temperature-solid, non-sticky, dissimilar, outer adhesive layers on opposite sides thereof, one of said outer adhesive layers being a heat-filleting epoxy resin layer which fluidizes as it is elevated in temperature above about 100° F. and then cures to a relatively rigid thermoset infusible state at higher elevated temperatures above about 200° F., said epoxy resin layer comprising a room-temperature-solid epoxy resin having oxirane oxygen groups, a latent heat-activatible curing agent for said epoxy resin and a flow-control ingredient blended throughout the composition of said layer to inhibit excessive flowing of said layer as it is elevated to fluidization temperatures, and the other of said outer adhesive layers being an uncured, heat-tackifiable, rubber-like adhesive layer which on heating develops high tackiness and then cures to a tough, flexible and yieldable thermoset condition capable of absorbing and dissipating within itself shock forces to which the cured sheet material may be subjected in a use application, thereby shielding the cured relatively brittle epoxy resin layer from said forces.

15. The article of claim 14 including also a scrim-type material associated with said heat-filleting epoxy resin layer, as an integral part thereof.

16. A composite handleable shippable unitary flexible laminated adhesive sheet material having room-temperature-solid, non-sticky, dissimilar, outer adhesive layers on opposite sides thereof and further having a scrim-type material as an integral part of the laminate thereof, one of said outer adhesive layers of said sheet material being a heat-tackifiable rubbery layer containing a rubber-like elastomer, said rubbery layer being curable at elevated temperatures to a non-brittle thermoset condition, and the other of said outer adhesive layers of said sheet material being a heat-filleting epoxy resin layer which is fluidized as it is elevated in temperature and then cured to a relatively rigid thermoset infusible state at higher elevated temperatures which serve also to cure said rubbery layer, said epoxy resin layer comprising a room-temperature-solid epoxy resin and a heat-activatible curing agent therefor.

References Cited in the file of this patent

UNITED STATES PATENTS

| 2,512,875 | Reynolds | Jan. 27, 1950 |
| 2,607,709 | Simpson | Aug. 19, 1952 |
| 2,608,500 | Delmar | Aug. 26, 1952 |
| 2,609,068 | Pajak | Sept. 2, 1952 |
| 2,650,185 | Larson | Aug. 25, 1953 |
| 2,706,166 | Gurney | Apr. 12, 1955 |

UNITED STATES PATENT OFFICE
CERTIFICATION OF CORRECTION

Patent No. 2,951,004  August 30, 1960

Albert F. Martin et al.

It is hereby certified that error appears in the above numbered patent requiring correction and that the said Letters Patent should read as corrected below.

Column 2, line 2, for "thermostat" read -- thermoset --; column 3, lines 2 and 3, for "herefore" read -- heretofore --; line 5, for "reinformed" read -- reinforced --; column 4, line 54, for "it" read -- at --; column 6, line 26, for "higher" read -- highly --; column 8, line 47, for "elastomerphenolic" read -- elastomer-phenolic --; column 9, line 19, after "160-170° F." strike out the closing parenthesis; line 20, for "alcoholic-insoluble" read -- alcohol-insoluble --; same column 9, line 21, after "300° F." insert a closing parenthesis; column 11, line 1, for "resuling" read -- resulting --; column 13, line 15, after "solid" insert a comma; line 72, for "phenolaldehyde" read -- phenol-aldehyde --.

Signed and sealed this 23rd day of May 1961.

(SEAL)
Attest:

ERNEST W. SWIDER
Attesting Officer

DAVID L. LADD
Commissioner of Patents